(12) United States Patent
Koschinat (10) Patent No.: US 9,469,279 B2
(45) Date of Patent: Oct. 18, 2016

(54) SUPPORT FOR SUPPORTING AND COMPENSATING A SHIFT IN THE POSITION OF A PARKED SEMI-TRAILER

(71) Applicant: Hubert Koschinat, Hösbach (DE)

(72) Inventor: Hubert Koschinat, Hösbach (DE)

( * ) Notice: Subject to any disclaimer, the term of this patent is extended or adjusted under 35 U.S.C. 154(b) by 0 days.

(21) Appl. No.: 14/917,816

(22) PCT Filed: Sep. 5, 2014

(86) PCT No.: PCT/DE2014/000461
§ 371 (c)(1),
(2) Date: Mar. 9, 2016

(87) PCT Pub. No.: WO2015/035972
PCT Pub. Date: Mar. 19, 2015

(65) Prior Publication Data
US 2016/0221544 A1  Aug. 4, 2016

(30) Foreign Application Priority Data
Sep. 10, 2013  (DE) .......................... 10 2013 015 477

(51) Int. Cl.
*B60S 9/02* (2006.01)
*B60S 9/04* (2006.01)

(52) U.S. Cl.
CPC ........................ *B60S 9/04* (2013.01)

(58) Field of Classification Search
CPC ............................................. B60S 9/02–9/04
See application file for complete search history.

(56) References Cited

U.S. PATENT DOCUMENTS

| | | | | |
|---|---|---|---|---|
| 4,124,225 A * | 11/1978 | Lozada | ..................... | B60S 9/04 280/763.1 |
| 4,307,896 A * | 12/1981 | Walther | .................... | B60S 9/04 254/419 |
| 6,623,035 B1 * | 9/2003 | Schneider | ................. | B60S 9/04 248/161 |

FOREIGN PATENT DOCUMENTS

| | | |
|---|---|---|
| DE | 37 05 498 A1 | 9/1987 |
| DE | 40 03 414 A1 | 8/1991 |
| DE | 44 26 361 A1 | 2/1996 |
| DE | 44 26 361 C2 | 12/1997 |
| DE | 20 2008 015 984 U1 | 3/2009 |
| EP | 0 972 684 B1 | 9/2006 |
| WO | 2010/100038 A1 | 9/2010 |

* cited by examiner

*Primary Examiner* — John Walters
*Assistant Examiner* — James Triggs
(74) *Attorney, Agent, or Firm* — McGlew and Tuttle, P.C.

(57) ABSTRACT

The invention relates to a support (2) for supporting and compensating a shift in the position of a parked semi-trailer (1), which support consists of an outer support tube (21) and an inner support (22), which can be telescopically slid into the outer support tube (21) and consists of a support upper part (221) and a support lower part (222), said parts being hinged together by a pivot bearing (23), wherein the lower end of the support lower part (222) is rigidly connected to a rolling segment (24) and the outer surface of the outer support tube (21) is fully closed at least along the edge facing the inner support (22), and wherein the rolling segment (24) has a dished shape and in the retracted state of the support (2) the outer support tube (21) protrudes into the rolling segment (24).

9 Claims, 4 Drawing Sheets

Fig. 4

SUPPORT FOR SUPPORTING AND COMPENSATING A SHIFT IN THE POSITION OF A PARKED SEMI-TRAILER

The present invention relates to a support for supporting and compensating a shift in the position of a parked semi-trailer, which support consists of an outer support tube and an inner support, which can be telescopically slid into the outer support tube and consists of a support middle part and a support base part, said parts being hinged together by a pivot bearing, wherein the lower end of the support base part is rigidly connected to a rolling segment and the outer surface of the outer support tube is fully closed along the entire circumference at least along the edge facing the inner support.

When in the prior art a semi-trailer is separated from a tractor trailer in order to be parked, the front part of the semi-trailer will be supported by the usually paired support columns, mainly on the vehicle frame, such as DE 40 03 414 A1 shows.

Such supports consist of an outer support tube, in which before the departure an inner support is inserted telescopically, so that sufficient ground clearance is ensured. To park the semi-trailer, the inner support is lowered again and carries the front part of the semitrailer. Thereby the semi-trailer without the tractor remains in an approximately horizontal position. For reconnecting the tractor drives with its fifth wheel coupling underneath the front part of the semitrailer, locks the fifth wheel coupling, connects the pneumatic lines and retracts the supports again.

A typical feature of the known supports for air-sprung semitrailers is a pivotable rolling segment at the bottom of each extendable inner support, which is shown e.g. in DE 40 03 414 A1, DE 44 26 361 C2 and EP 0 972 687 B1. The rolling segment is a part of a wheel, which rolls on a surface, but only for a limited distance, the length of which is dictated by the curved rolling surface of the rolling segment. This rolling segment compensates during longer periods of standstill the position offset in the vehicle longitudinal direction, which has the following cause:

Because of the permissible leakage in the pneumatic suspension system the air-suspension bellows between the trailing arms and the vehicle frame gradually collapse, so that the rear part of the semi-trailer is lowered.

The mostly common axle suspension to the vehicle frame of a semi-trailer is a trailer arm, which is connected at one end pivotally to the vehicle frame and which carries at the other end a wheel and which is supported with an air-suspension bellow against the vehicle frame. The trailer arms are oriented in the direction of travel of the trailer, which is why they are also called longitudinal links. The brakes of the trailer are automatically blocked in the uncoupled state, so that the wheels can not rotate. If the air-suspension bellows sink because of an air loss a, the rear part of the trailer is lowered, whereby the longitudinal links are pivoted toward the vehicle frame. Since the braked wheels are firmly connected to the longitudinal links, they roll during lowering on the parking area and push the semi-trailer in the direction of travel.

With the presently on commercial vehicles widespread diameters of the wheels and the amount of lowering at standstill, caused by air suspension units, this horizontal displacement—also called positional offset—is up to 15 cm. For this distance the end of the extended support, which stands up on the parking area, must be able to move against the trailer. Can it not, in particular the inner support is exposed to such a high bending stress that it can be kinked.

To avoid this, swiveling rolling segments have been developed which can compensate for the resulting horizontal positional displacement. For example DE 40 03 414 A1, DE 44 26 361 C2 and EP 0 972 687 B1 describe pivoted roll segments, which roll on rolling plates in the longitudinal direction of the vehicle. The DE 37 05 498 A1 shows a rolling segment, which relies without rolling plate directly on the surface, e.g. on a parking lot.

In all the aforementioned cases, the radius of the rolling segment is not limited in size, so that it can be adequately dimensioned for the maximum permissible weight of the semitrailer. Disadvantageously, such a large-sized rolling segment is so much wider and/or longer than the cross section of the support that it no longer fits into its interior. Therefore the rolling segment is located—in the retracted state of the support—still largely below and outside of the outer support tube. This creates the substantial disadvantage that it increases the minimum overall height of the retracted support remarkably.

To mitigate this disadvantage, the DE 20 2008 015 984 U1 describes to cut open recesses into the lower edge of the outer support tube. Thereby it will be achieved, that during retraction the pivot bearing or other sections of the rolling segment, which protrude out of the cross section of the outer support tube, can be moved further into the recess instead of colliding with the edge of the outer support tube.

Unfortunately, these recesses weaken the outer supporting tube. In order to recover a sufficient flexural strength of the support a reinforcement of the wall of the supporting tube becomes necessary in the zone of the recesses and above it. The cutting of the recesses and the necessary reinforcement represent a significant effort.

Alternatively, proposes the DE 20 2008 015 984 U1 to form the portion of the rolling segment above the actual rolling radius with such a small cross section that it fits into the outer support tube. The result is an inner support, consisting of a support middle part and a support base that are hinged together via a pivot bearing. Disadvantageously protrudes in the retracted position of the support the remaining rolling segment fully downward over the outer support tube and thus increases the minimum height.

The aim of the present invention is to eliminate the aforementioned disadvantages at a support with the smallest possible cross-section and suitable for air-sprung semitrailer thereby that the support in the retracted position can be pushed together to the lowest possible height, preferably so low that the support may be mounted underneath the longitudinal frame members, whereby the material required, the weight and the costs are to be reduced and the assembly of the supports is to be simplified. In a variant the support shall be releasably attached to the continuous profile of the longitudinal frame members, without any changes need to be made to the longitudinal frame member itself.

As a solution the invention suggests that the rolling segment has a dished shape and in the retracted state of the support the outer support tube protrudes into the rolling segment.

These two characteristic features of the invention describes the following derivation: At a support according to the present invention the inner support consists of a support middle part and a support base part, which are hinged together via a pivot bearing. Both parts can be inserted into the outer support tube. The lower end of the support base part is rigidly connected to a rolling segment. This rolling segment can not be pushed into the outer support tube, because its length is greater than the cross section of the support base part. The reason for this is that in practice the rolling segment has to compensate with the length of its rolling circumference a position offset in one direction of up to 15 cm. However, such a size of the cross-section of the outer support tube in its longitudinal direction exceeds clearly in practice the dimension, which is required by the load capacity. That would increase weight and cost unnecessarily.

In order that the inventive rolling segment increases the minimum overall height of the retracted support only marginal, the invention prefers as a rolling segment a one-dimensional curved steel sheet, which protrudes on both sides over the support base part.

Its key advantage is that it increases the overall height of the retracted support only to the material thickness of the sheet. Note, however, that at maximum pivoting of the support base part, the freely projecting ends of the curved steel sheet could be overloaded or require such a large thickness that such a rolling segment would be too heavy.

Therefore it is a feature of this invention, to form the rolling segment and its rolling surface like a trough, e.g. as a pressed part made of steel sheet. Onto the edges of the cylindrical or similar to a cylinder shaped rolling surface are formed approximately vertically aligned sidewalls as a reinforcement, which complete the rolling segment to become a trough.

On the "deepest" point of the concave side of this trough the support base part is fixed, for example welded or bolted. During retraction of the support, the support base part moves further and further into the outer support tube and the trough is getting closer and closer to the outer support tube until—seen from the side—the sidewalls of the trough overlap the outer support tube. In the fully retracted position of the support protrudes the outer support tube into the trough. In order to achieve that a relatively narrow alley must be left free between the support base part and the sidewalls of the rolling segment.

When the trough is formed e.g. from sheet steel, it increases the entire support in its retracted position only to the sheet thickness, plus the curvature of the rolling surface, in practice only to a few millimeters. Thanks to this trough-like molding the rolling surface can be dimensioned larger than the cross sectional area of the support base part. Thus the force of the load, which the support has to transfer, is spread over a relatively large area. That is advantageous, when the position offset is large or the parking area of the semi-trailer is dirty.

In a structurally simple variant the rolling surface is shaped exactly as a circular cylinder segment. All the points of the surface always have the same distance to the pivot axis, which could be referred to as a "constant radius".

The rolling surface can however also be formed with "different radii", for example as an oval or as an ellipse. Then the semi-trailer can be kept in a substantially constant horizontal position despite the sinking of the air-suspension bellows, which is advantageous when re-coupling a tractor. Alternatively, the rolling surface consists of one or more short partial areas or partial layers, which are strung together.

As explained, the inner support consists of three parts, namely the support middle part, the support base part and the pivot bearing, which connects the two support parts together. In the "retracted" state all three parts immerge all the way into the outer support tube. In order to push the pivot bearing into the outer support tube, it must not protrude outwards over the inner support.

It is another innovative idea to divide the pivot bearing in two parts of a hinge which are spaced apart. This distance should be so large that a threaded spindle or another drive for the movement of the internal support can be guided through the space between the two hinge parts.

In an interesting embodiment each hinge part of the pivot bearing consists of a short bearing stub and a bearing shell and a retaining ring, which surrounds stub and shell and thus holds them together. The bearing shell is concentric to the bearing stub and both cooperate as a sliding bearing. Because the radial moment of resistance of the entire pivot bearing should be at least as large, as the pressure capacity of the other two parts of the inner support, it follows that the bearing stubs, the bearing sheds and the surrounding retaining rings must be dimensioned to the required moment of resistance accordingly.

The previously mentioned screw or threaded spindle is widely used as a lifting drive for inner support, because it is simple, robust, long-lasting and economical to manufacture. According to the object of the invention, to reduce the overall height of the support, also must be reduced the height of any extensions at the ends of the threaded spindle, which are necessary for its operation.

The invention proposes a threaded spindle which is rotatably mounted at the upper end of the outer support tube and is engaged with its thread in a threaded supporting plate, which is fixedly connected to the upper end of the support middle part. Such a threaded spindle needs a stop, which prevents that the spindle will be unscrewed out of the treaded plate, whereby the inner support would drop out. For this purpose it is obvious and known, to attach at the lower end of the spindle a mechanical stop, whose diameter is larger than that of the thread and thus hits the threaded plate at the end of the pushing of the inner support It is a further essential idea of the invention, that the function of confining is performed by the outer support tube together with the support middle part. For this purpose, the invention places two guiding sleeves between the support middle part and the outer support tube. The upper guiding sleeve is fastened on the outside of the support middle part near its upper end and can slide along the inner surface of the outer support tube. The lower guiding sleeve is—preferably detachably—mounted on the inside of the outer support tube near its lower end and can slide on the outer surfaces of the support middle and base parts. The outer support tube and the inner support do not glide directly on each other, but will be guided against each other by the two guiding sleeves.

The lower guiding sleeve is mounted on the lower end of the outer support tube and fastened thereto, only after the support middle part with the guiding sleeve fixed at its upper end has been inserted into the outer support tube.

If the support middle part is pushed out of the outer support tube for the maximum permissible way down, the end edges of the two guiding sleeves abut each other and thus limit the stroke. The threaded spindle must only be long enough, to reach the threaded plate.

The sum of the height of the two guiding sleeves should not be less than that dimension of overlapping between the support middle part and the outer support tube, which is required for a sufficient buckling strength of the entire support. In general, the said sum should not be smaller than the width of the support middle part. In addition, the guiding sleeves reinforce the ends of the support middle part and the outer support tube, which are especially strained in the extended state by possibly impinging side forces.

A further benefit of these guiding sleeves is that the outer support tube and the inner support can be made out of cost effective, welded tubes. They need not to be straightened.

Instead the may differ from the otherwise necessary precise straightness by the distortion that is caused by the welding.

With a support according to the present invention the sum of the maximum extendable lengths of the support middle part, the height of the pivot bearing and the height of the support base part minus the small height of the rolling segment in its center results in the maximum achievable ground clearance between the bottom edge of the retracted support and the parking surface, e.g. a parking lot. Studies have shown that in practice about 25 cm is sufficient. An additional reserve of stroke of at least 5 cm results in a full stroke that is sufficient for truck semi-trailers.

A rolling segment, which is according to the present invention, is well suited for the direct attachment and rolling on parking surfaces with a high surface strength such as e.g. concrete surfaces. If for example, a fleet operator generally only allows for the uncoupling of the trailers on such surfaces, and the rolling segments will have direct contact to such surfaces, the required compensation of the positional offset is secured.

Perhaps, however, the surface of the parking area can be so soft that the rolling segments no longer set up on it with an approximately linear contact surface, but can be pressed in, which significantly complicates the compensation of a positional offset. For such parking surfaces it is known and advantageous to place each rolling segment on a rolling plate, which does not sink into the soft surface thanks to its much larger area. These rolling plates are usually pulled onto the rolling segments by at least two tension springs and are usually in addition for the event of failure of the tension springs secured with safety bolts to prevent loss.

It should be noted that the entire vertical length of the retracted support from its top edge down to the lower edge of the rolling plate is generally larger than the maximum achievable stroke for the following reasons: First, the outer support tube must still overlap the inner support in the extended state, in practice by approximately the width of its cross-section. Secondly, a drive for the lifting and the lowering of the inner support has to be placed, e.g. a gear at the upper end of the outer support tube.

With the features of a support according to the present invention it is now for the first time possible to reduce the height so far that the support can be secured below a vehicle frame and not—as usual before—on the side of the vehicle frame.

According to prior art is for stabilizing and centering of the unloaded rolling plate usually a first spring linked to the left haft of the rolling plate and a second spring linked to the right half of the rolling plate. Their other ends are connected to the rolling segment. It is a further innovative idea of the invention, instead to use only a single spring which is arranged in the interior of the support base part. The spring is clamped between the rolling segment and a contortion-proof pressure plate, such as a threaded cap, which is held by a bridge inside the support base part. If a rolling plate is assembled, the spring will be further tensed by means of a pulling rod or another tensile element, which links the cap on the spring with the rolling plate, so that the rolling plate is pressed firmly against the roller segment.

For eccentric loading of the rolling plate during a positional offset, the spring is compressed further, thus allowing the rolling segment to roll on the rolling plate. But if the rolling plate is unloaded, the spring pulls the rolling plate dose to the opening and holds it there. This prevents that during the lowering of the support the unloaded rolling plate hits the parking surface only with an edge and/or anchorless hits the rolling segment while driving. In addition, the spring itself is well protected in the interior of the support base part against harmful influences from the outside and does dam additional space.

The rolling segment is in the simplest case a cylinder segment which contacts the rolling plate along a line. If an unloaded rolling plate is pulled by the spring to the opening in the rolling segment, then it touches indeed the rolling segment along this line. But it is still in an unstable condition, because it can oscillate back and forth on the curved rolling segment.

To prevent these oscillations and the resulting noise, the invention recommends to flatten the rolling segment around the opening for the spring. Then the unloaded rolling plate rests on the flattened surface adjacent to the opening and is thus in a stable state.

In a slightly more complex version for uneven parking surfaces, the rolling plate shall swivel transversely to the driving direction of the semi-trailer. For this purpose the rolling segment shall be shaped as a torus segment, similarly to the tires of a motorcycle. The rolling plate shall be formed complementary to it, namely as an elongated, curved and concave cylinder segment, also named as a groove. For this embodiment a stabilization of the unloaded rolling plate is possible: In the torus of the rolling segment close to the opening for the spring is inserted a short cylinder segment as a "straight" section. Then the "groove-shaped" unloaded rolling plate rests in a stable state on the cylindrical surface near the opening.

The anchoring of a tension spring within the support base part is possible, but complicated and difficult to assemble. Instead the invention proposes to use a pressure spring, which rests with its first end on the inside of the rolling segment. The second end of the spring protrudes into the interior of the support base part and is there connected via a pressure plate and a pulling rod with the rolling plate.

When the pressure spring is designed as a helical spring, the pulling rod preferably extends through the interior of the helical spring. If a screw in the center is selected as the pulling rod, then it can be screwed into a female thread in the pressure plate. This embodiment of the pulling rod can be called the central screw. Such a pressure plate is referred to herein as a "threaded cap". A circumferential collar or a cone on this threaded cap centers the helical spring in the middle, so that the force of the pressure spring is derived as a tensile force into the screw.

The spring is especially effective if it is built in with a pretension. Therefore the invention suggests as an assembly aid a bridge, made of flat steel, which is two times angled and formed approximately into a U. The bridge arches itself centrally over the opening in the rolling segment. The bridge is mounted either in the support base part or on the inside of the rolling segment. It is essential that the bridge's underside, which faces to the opening of the rolling segment, is shaped complementarily to the threaded cap. The threaded cap might have e.g. a square or another non-circular outer contour, which can be connected to the bridge form locking, so that when screwing the central screw in the threaded cap, the bridge can hold a corresponding counter torque.

When the rolling segment is attached to the support base part, its interior is in practice no longer easily accessible. It is tedious to assemble the spring from the still open top end of the support base part. To simplify the installation, the invention proposes that before attaching the rolling segment to the support base part, the bridge shall be mounted on the rolling segment. Then, the threaded cap and the compressed spring shall be pushed under the bridge. And then the spring will be relieved until the threaded cap is pressed form-locking on the underside of the bridge.

In the next step the rolling segment together with the bridge, the threaded cap and the pressure spring is welded to the support base part or mounted in another way. Thereafter it is from the outside of the rolling segment possible to bolt the rolling plate with the central screw down to the threaded cap, although the threaded cap is neither visible nor directly accessible in this state.

Another interesting advantage of this embodiment is that after the above-described installation of the pressure spring with the threaded cap and the bridge it is possible that the rolling segment without a rolling plate can roll directly on concrete or on other hard surfaces. If later parking on softer surfaces will be required, a rolling plate can be retrofitted quickly with a central screw as described.

The embodiment of securing the rolling plate by a single, central spring is a very elegant and with adequate dimensioning of the spring also robust solution. In each phase the compression spring ensures a contact of the rolling plate to the rolling segment.

When the pulling rod is embodied as a central screw, which cooperates with a pressure spring, the invention proposes that the pulling rod carries a ball head. This ball head is formed, for example, on the shaft of the central screw—as usual for bolts to mount wheels on cars. Or a washer with a ball head is plugged under the head of the central screw.

This ball head is pivoted in a complementarily shaped bulge in the rolling plate. The bulge is pierced with a slot, which is sufficiently wide and elongated in the pivoting direction. Through the slot passes the shank of the pulling rod—also referred to as central screw.

An advantage of this design is that when the spring breaks the rolling plate will not get lost, but will be retained by the pulling rod and the threaded cap.

Instead of a single central spring as described above, two or more springs can be installed. They can be arranged transverse to the direction of travel next to one another on a line or they are spread over the cross section of the support base part. An advantage of two, in the direction of travel one behind the other arranged springs is the active stabilization of the unloaded rolling plate in the central position. However, the invention prefers a single, central spring as the most economically alternative.

If a support according to the present invention will be used on an uneven and/or wet and/or snowy and/or otherwise contaminated surface, contaminants could get between the rolling segment and the rolling plate. Caused by the dirt and/or its slope, the rolling segment could slide around on the rolling plate, whereby the spring or the pulling rod which connects the rolling segment with the rolling plate, could be damaged or even ruptured.

To avoid this, the relative movement between the rolling segment and the rolling plate has to be limited to a pure rolling movement. For this purpose, the invention recommends a toothing between the rolling plate and the rolling segment.

In principle any in the mechanical engineering known toothing can be selected. For a maximum insensitivity to contamination and for an economic production the invention prefers a simple and robust design: Into the rolling segment at least one recess or hole for a cog is formed. Into each projects a tooth increase or cog, which is attached to or formed on the rolling plate. Preferably, these increases or cogs are shaped as a truncated cone or as a spherical segment, because they are to be produced easier in comparison to angular shapes. They also can press contaminants through the holes in the rolling segment.

The reduced height of a support according to the present invention allows to mount it on the underside of the vehicle frame. The previously common, side mounting with its high effort can be saved. For this, the vehicle frame can rest on the top edge of the outer support tube. Alternatively a lid can close the top of the outer support tube and carry the vehicle frame. Then a clamping device is sufficient that connects the support detachably to the lower flange of the longitudinal frame support. For example a single or two U-shaped retaining clips are formed or attached to the lid or to the outer support tube, which enclose the lower flange and are secured on it with a clamp.

To avoid paint damage on the lower flange of the vehicle frame, it makes sense, to place a strip of an anti-corrosive material—for example zinc sheet—between the hearing points and the ends of the clamping screws, for example rotatable and anti-corrosive pressure plates.

With a similar clamping fastening diagonally oriented support profiles can be attached to the lower flanges. Alternatively the retaining clip can be extended so far, that it holds the diagonal support profiles in addition. In this way the number of clamping screws can be reduced. Alternatively, gusset plates can be integrated between the outer support tube and the clamping device. This version is suitable for installation in the front part of the normal profile of a vehicle frame, where the profile's height decreases directly aside the support in the direction of the fifth wheel.

On semi-trailers with a low height of the vehicle frame, such as flatbed trailers, the clamp may be also mounted laterally on the supports so that the support is arranged as hitherto usual at the side of the vehicle frame. Alternatively a support according to the present invention may be bolted in the conventional way onto hole perforated plates.

In the following, further details and features of the invention will be explained in more detail by way of an example. This shall not restrict the invention, but only explains it. In a schematic representation is shown:

FIG. 3: cross section in the direction of travel of support as shown in FIGS. 1b and 2a.

Figure 1A:
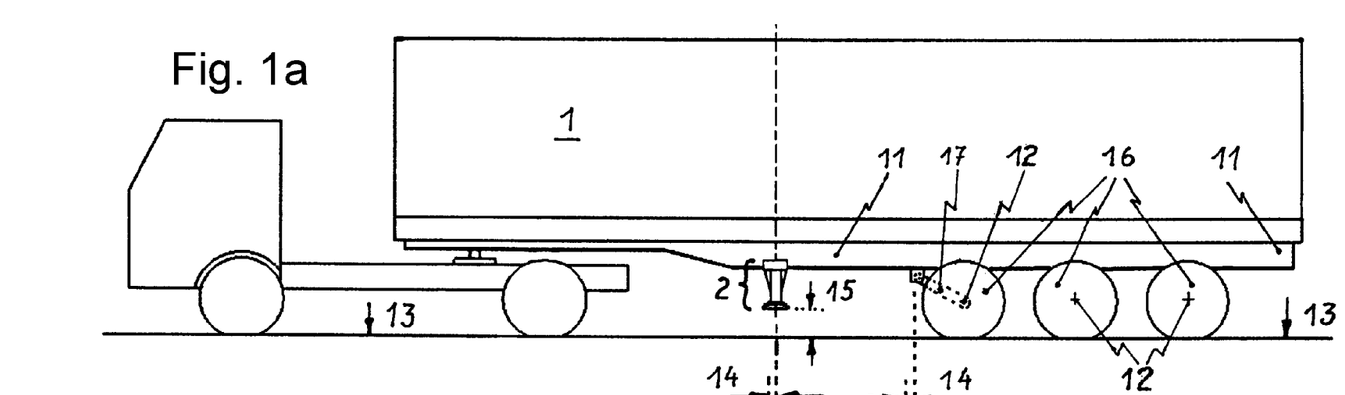
FIG. 1a: semitrailer with tractor and retracted support during driving.

FIG. 1a shows a semi-trailer (1) with a tractor on a parking area (13) in side view. With its front section the semi-trailer (1) rests on the tractor and is in the state of driving operation. On the underside of the semi-trailer (1) the vehicle frame (11) is to be seen. A support (2) according to the present invention is mounted in the front section of this frame (11). The support (2) is retracted in FIG. 1a, so that it has the ground clearance (15) from the parking area (13). To the rear section of the vehicle frame (11) is connected with trailing arms (17) each vehicle axle (12) with its two running wheels (16). FIG. 1 shows only one running wheel (16) of each axle (12) and one trailing arm (17). The trailing arms (17) are supported against the vehicle frame (11) with air-suspension bellows, which are not shown in FIG. 1a.

Figure 1B:
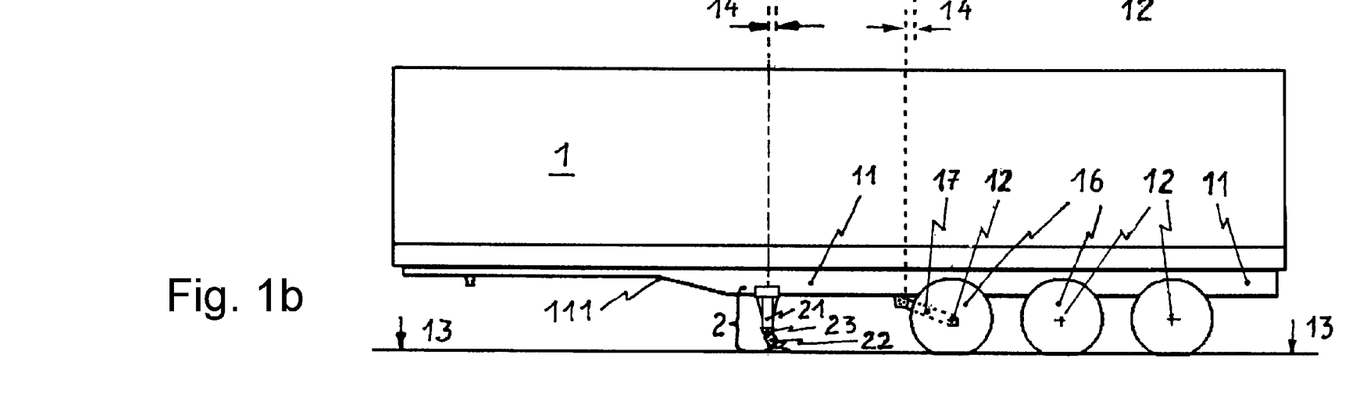
FIG. 1b: semi-trailer as shown in FIG. 1a, but in parking state without tractor and with extended inner support and pivoted support base part.

In FIG. 1b is drawn the same semi-trailer (1) as shown in FIG. 1a. The tractor is however disconnected and the front part of the semitrailer (1) is held by the support (2). The inner support (22) is pushed out of the outer support tube (21) and pivoted to an inclined position. In FIG. 1b it is good to comprehend why this incline has become necessary: The air-suspension bellows—which are not shown in FIG. 1b—are collapsed in itself, which is clue to prolonged standstill and is a permissible manner. Therefore, also the rear part of the semi-trailer (1) is lowered. Because the braked wheels (16) have rolled on the parking area (13) in the direction of travel, the position of the semi-trailer (1) is shifted in the same direction. In practice this position offset (14) may be up to 15 cm. Thereby also the attachment point of the support (2) on the vehicle frame (11) is shifted by the position offset (14). In FIG. 1b is to be seen that the trailing arms (17) with respect to their mounting point on the vehicle frame (11) and compared to FIG. 1a have a lower incline. Thus the running wheels (16) overlap the vehicle frame (11) more than in FIG. 1a.

The position offset (14) relative to the parking area (13) is compensated by the inventive support (2) by being able to reversibly "kink".

To enable a kink-like motion—and a subsequent reversal—in a support (2) according to the present invention is built in the pivot bearing (23) into the inner support (22). This pivot bearing (23) divides the inner support (22) in the support middle part (221) and the support base part (222), which can be seen only dimly in FIG. 1b, however very clearly in FIG. 2a.

Figure 2A:
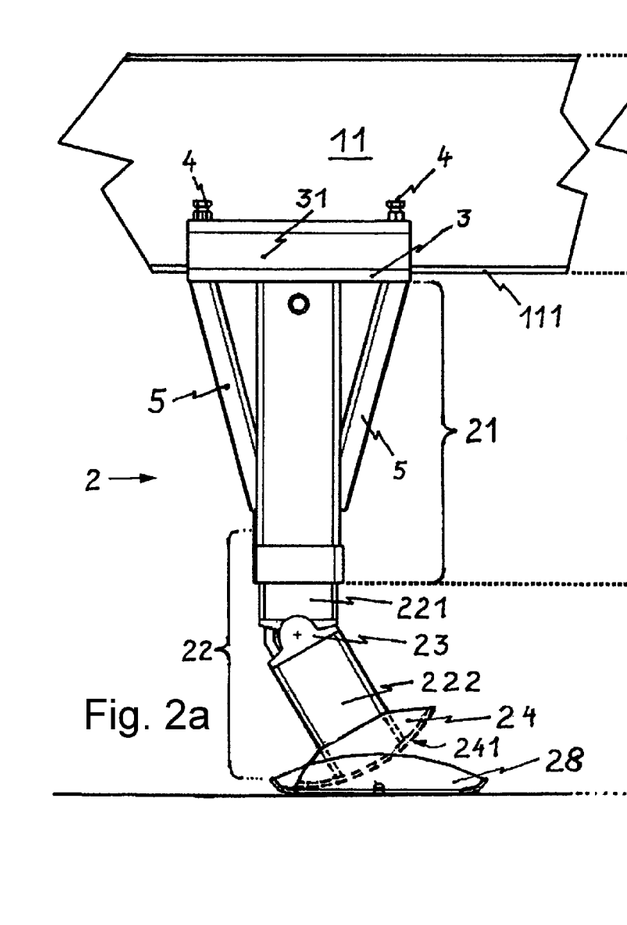
FIG. 2a: support as shown in FIG. 1b, however, with further extended inner support.

FIG. 2a shows the support (2) similar to FIG. 1b in parking position. The inner support (22) is extended and a position offset (14) is compensated. It is clearly visible that the pivot bearing (23) divides the inner support (22) into the support middle part (221) and the support base part (222). Unlike FIG. 1b, the inner support (22) is, however, further pushed out. More than the minimum length of the support middle part (221), which is required for the mechanical stability, remains still within the outer support tube (21).

Figure 4:
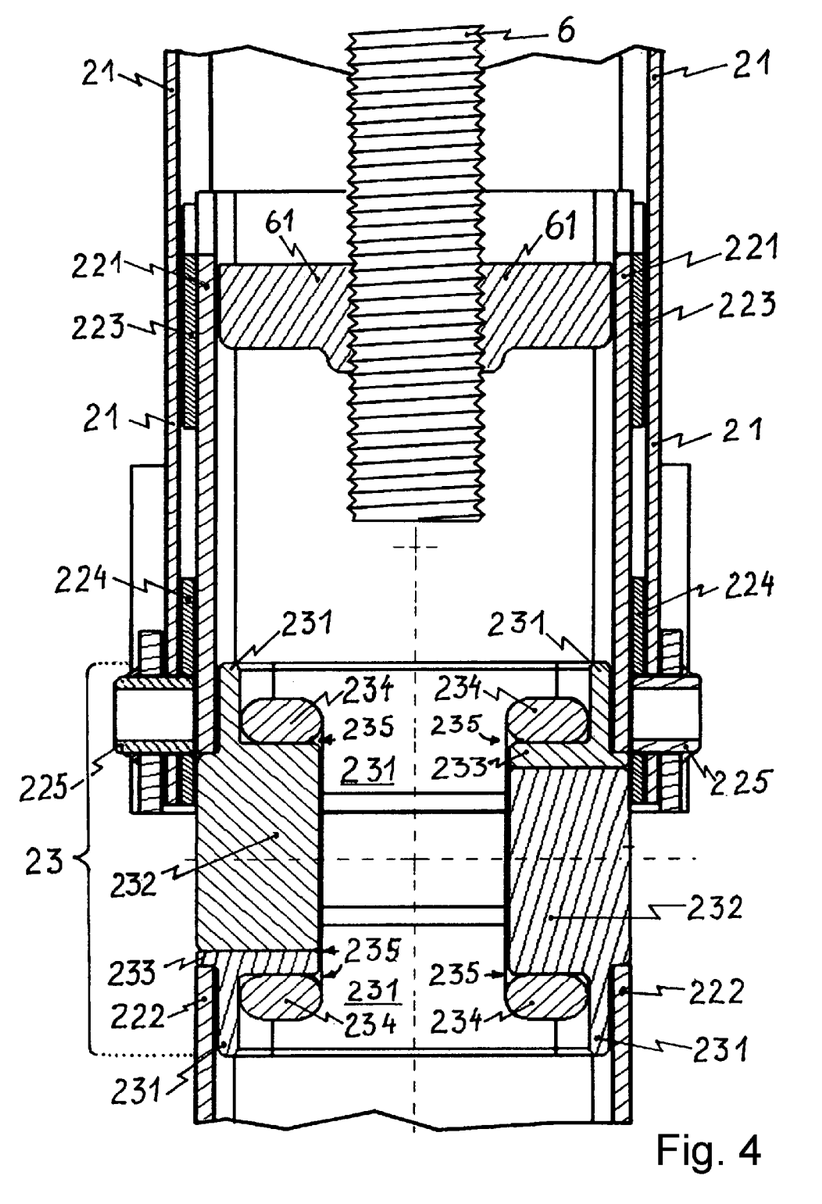
FIG. 4: cross section transverse to the direction of travel of support similar to FIGS. 1b, 2a, and 3.

FIGS. 2a makes plausible that the support middle part (221) and the support base part (222) have the same profile. Not in FIG. 2a but only in FIG. 4 is clearly visible that the pivot bearing (23) protrudes not beyond this profile in the direction of its axis. Therefore all three parts of the inner support (22) can be pushed into the outer support tube (21), as shown in FIG. 2b.

In FIG. 2a dashed lines show, how the support base part (222) projects into the roller segment (24) and thereby overlaps the side wall of the roller segment (24). From FIGS. 2a and 2b it cannot be read directly, that the side wall is closer to the viewer than the outer surface of the support base part (222) and thus an alley remains free between them.

Figure 2B:
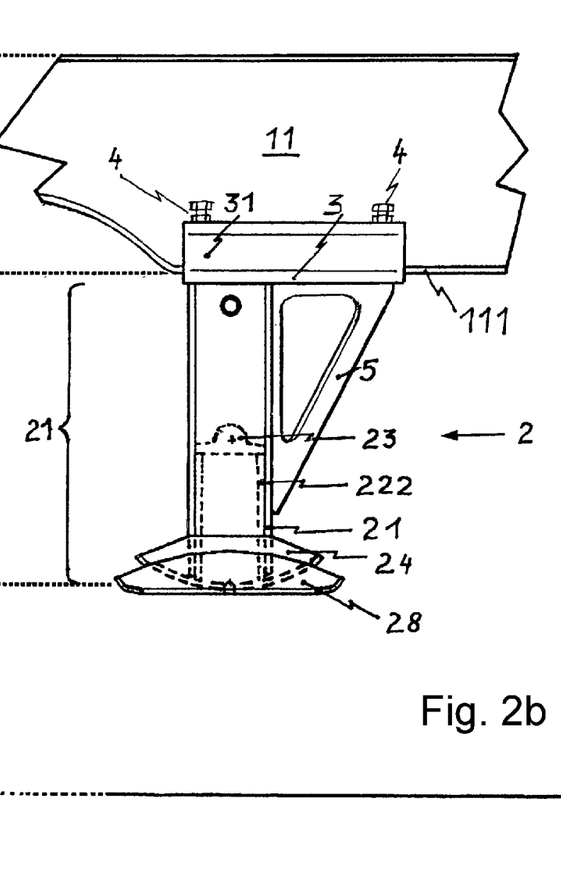
FIG. 2b: support as shown in FIG. 1a with retracted inner support, but with support profile only one side.

FIG. 2b shows the same support (2) as drawn in FIG. 2a, however without the inserted support middle part (221), but with the inserted pivot bearing (23) and the inserted support base part (222), both drawn with dashed lines.

No more visible—and therefore also dashed—is the lower end of the outer support tube (21), because it is immersed in the alley-like space between the side wall of the rolling segment (24) and the support base part (222).

The FIGS. 2a and 2b shows below the rolling segment (24) the rolling plate (28), on which the rolling segment (24) rolls with its rolling surface (241). The rolling surface (241) touches in FIG. 2a the left side of the rolling plate (28); in FIG. 2b the center of the rolling plate (28).

By comparing FIGS. 2a and 2b it becomes clear that the three elements of the internal support (22), namely the support middle part (221), the pivot bearing (23) and the support base part (222) can be pushed completely into the outer support tube (21), which illustrates a broken line between the FIGS. 2a and 2b.

In the FIGS. 2a and 2b the support (2) is mounted beneath the vehicle frame (11). For this a lid (3) is attached on top of the outer support tube (21), which rests on the underside of the lower flange (111) from the vehicle frame (11). Both the plate-shaped lid (3) and the strip-like bottom flange (111) are aligned in FIGS. 2a and 2b with their major surfaces perpendicular to the plane of projection. Therefore they show in FIGS. 2a and 2b only their front edges.

In the FIGS. 2a and 2b is only partly visible, how the retaining clips (31) are integrally formed onto the lid (3) and how they embrace with their U-shape the lower flange (111). Clearly visible are the clamping devices (4), which press the retaining clips (31) to the underside from the bottom flange (111).

In the FIGS. 2a and 2b is depicted as a possible variant that the lid (3) and the thereto-formed or connected retaining bracket (31) is extended beyond the outer support tube (21). At these extensions are attached supporting profiles (5), which connect the outer support tube (21) and the lid (3) to each other in an inclined course. FIG. 2a shows a variant in which the lid (3) is extended beyond each side and a supporting profile (5) is attached on both sides. FIG. 2b shows another embodiment of the support with only one supporting profile (5), which is designed here as a gusset plate. Such one-sided supported design is particularly advantageous when the support (2) shall be mounted directly aside the incipient rejuvenation of the vehicle frame (11). The rejuvenation in the direction of the fifth wheel plate begins in FIG. 2b left.

Out of FIGS. 2a and 2b it is well understood that thereby the buckling strength of the mounting of the support (2) in or against the driving direction of the semi-trailer (1) is significantly increased.

Figure 3:
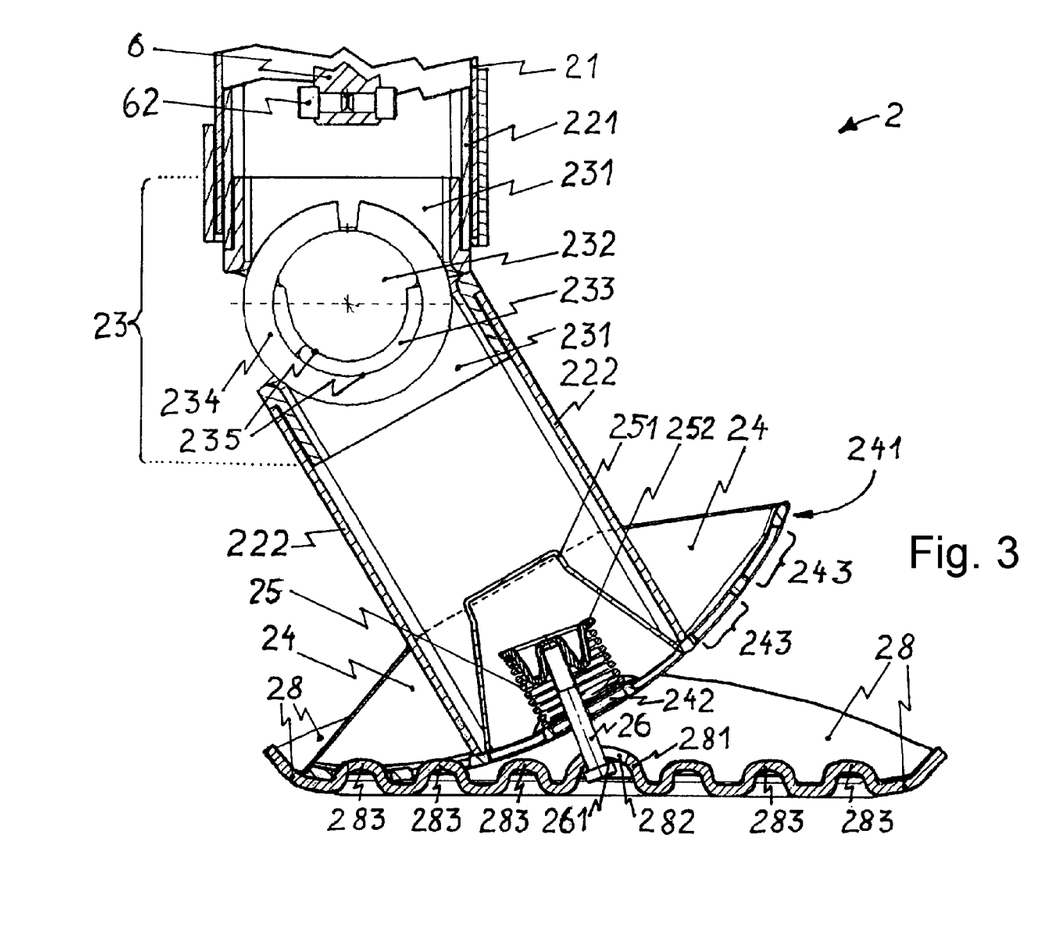

Out of the support (2) as shown in FIG. 2a, in FIG. 3 the lower half is cut open along a sectional plane, which runs in the driving direction of the semi-trailer. At the top of the FIG. 3 the narrow cross-sections of the walls of the outer support tube (21) are to be seen at the far sides. Its outer surface is surrounded by the cross-sections of a reinforcing collar. On the inner surface of the outer support tube (21) rests the support middle part (221) and slides on it in vertical direction, when being extended and retracted.

In the lower end of the support middle part (221) the upper section of the pivot hearing (23) is inserted and into the upper end of the support base part (222) the lower section of the pivot bearing (23) is inserted. The centre line of the pivot bearing (23) is directed in FIG. 3 towards the viewer. Another sectional drawing, which is perpendicular to the sectional plane of FIG. 3 and which cuts through an identical pivot bearing (23), is shown in FIG. 4.

FIG. 4 shows that the pivot bearing (23) consists of two narrow hinge parts, between which the threaded spindle (6) moves there through, when the support middle part (221) and the support base part (222) are inserted in the outer support tube (21).

The threaded spindle (6) in the embodiment shown in FIG. 3 has at its lower end a cantilevered stop (62), which restricts the maximum stroke of the support (2). FIG. 4 shows another embodiment of the threaded spindle (6) without such a stop (62).

FIGS. 3 and 4 show the pivot bearing (23) in the same embodiment as a sliding bearing. It is composed of two mutually identical parts, which are inserted in the square profile of the support middle part (221) and the support base part (222). Each of these parts consists of a holding portion (231) having the shape of a square frame, which is plugged in respectively in one support part (221, 222). On each holding portion (231) is formed on a voluminous bearing stub (232). The stub (232) slides in a complementary and concentric bearing shell (233), which is formed on the respectively other holding portion (231). In FIG. 3 is their centerline directed towards the viewer. In FIG. 4 both elements are cut along their centerline.

The outside of one bearing stub (232) and the outside of one bearing shell (233) together form a large cylinder. The radius of the cylinder remains constant, when the two holding portions (231) are pivoted against each other. The centerline of that cylinder is the centerline of the pivot bearing (23). Therefore one retaining ring (234) can hold together one bearing stub (232) and one bearing shell (233), when the support base part (222) is pivoted and the bearing stub (232) and the bearing shell (233) slide on the bearing surfaces (235).

In FIG. 3 it is easily to be seen, how the lower holding section (231) is inserted into the support base part (222) and thereby firmly connected with it. If the state of the inner support (22) is straight, the two holding portions (231) are pivoted to each other by 180°.

At the lower end of the support base part (222) the rolling segment (24) is fixed. In FIG. 3 can be seen clearly the arcuate rolling surface (241) of the rolling segment (24), which protrudes over the support base part (222) on both sides.

FIG. 3 depicts the state of maximal buckling between the support base part (222) and the support middle part (221). In this state the entire force of the weight is a burden on the left end of the rolling surface (241). In order that its end section will not be overloaded and will not crack, it is reinforced with a sidewall, which is mounted on it vertically or formed on. From this sidewall are to be seen in FIG. 3 two triangular sections. It is very important that these triangular sections are not connected with the support base part. Instead they are part of one single continuous sidewall, of which the non-visible section is depicted dashed. It is of great importance for the invention, that in the alley-like interspace between the sidewall and the support base part (222) immerges the outer support tube (21), if the support base part (221) is fully retracted.

In the lower section of the FIG. 3 is well recognizable, how the rolling segment (24) rolls on the rolling plate (28). In the depicted sectional plane the rolling surface (241) is relatively small, because it is pierced in the middle with the opening (242) and at both sides with respectively three holes for a cog (243). But in behind and in front of the sectional plane a continuously closed section of the rolling surface (241) follows.

In every hole for a cog (243) immerges a cog (283) from the rolling plate (28), depending on the angle position of the support base part (222). In FIG. 3 it is well recognizable, how the two cogs (238) at the left protrude into two holes (243). Thereby the rolling segment (24) is guided compulsory in every angle position when it rolls. It cannot shift away from the rolling plate (28) in any direction. That is the single and therefore critically important conducting element for the rolling plate (28) on the rolling segment (24), because the sidewalls of the rolling segment (24) and the rolling plate (28) are spaced to each other, so that they will fit into each other, when the inner support (22) fits into the lower end of the outer support tube (21) in the retracted state.

In the middle of the rolling segment (24) the opening (242) breaks through the rolling surface (241). This opening (242) gives space for the movement of the spring-loaded pulling rod (26), which connects the rolling plate (28) with the rolling segment (24). In addition, the opening (242) allows the immersion of the dome-shaped bulge (281) when the support (2) is released and the rolling plate (28) is pulled back to its start position.

In FIG. 3 is not shown, how the pulling rod (26) ensures that the unloaded rolling plate (28) will not drop down during the driving or during the retracting. Instead a loaded state is shown, in which the pulling rod (26) has arrived at its left-hand stop within the slot (282) in the dome-shaped bulge (281) in which the ball head (261) of the pulling rod (26) slides back and forth. At the variant of FIG. 3 the ball head (261) consists of a cylindrical head on the pulling rod (26), also named central screw (26). Thereon is plugged a ball shaped washer as a ring. In another embodiment, which is not shown here, the head of the screw can be formed as a ball segment. Thereby the central screw (26) can be moved synchronous to the angle position of the support base part (222) and protrudes always through the opening (242) into the interior of the rolling segment (24).

There the central screw (26) is bolted to the threaded cap (252) which rests on the biased pressure spring (25). The version of the threaded cap (252), which is shown in FIG. 3, is for example a square sheet pressing member with a centering cone. The outer flank of the centering cone centers the threaded cap (252) in the pressure spring (25), which is designed as a helical spring. This ensures that the threaded cap (252) always rests thereon in a form-fitting manner even in extreme deformation of the pressure spring (25).

In FIG. 3 it is very well understood, how the threaded cap (252) reverses the direction of the force of the pressure spring (25) and transmits it into a tensile force, which draws the rolling plate (28) on to the rolling segment (24) via the central screw (26)

In FIG. 3, the bridge (251) is good to be seen and comprehensible how it serves as a mounting aid for the threaded cap (252), the pressure spring (25), and the central screw (26). Because the pressure spring (25) shall be used with an initial tension, first the threaded cap (252) is inserted into the compression spring (25) during assembly. Then both are pressed together so far that they can be pushed sideways under the bridge (251). In this state, which is not shown in FIG. 3, the threaded cap (252) is pressed against the central part of the bridge (251). In FIG. 3 it is visible that the threaded cap (252) has the same width as the middle part of the bridge (251). Thereby the two edges of the threaded cap (252) will be pressed into the corners of the angled bridge (251), when the contour of the cap is for example a square.

In FIG. 3 it can not be displayed, that these two edges are straight lines and parallel to each other, because they point to the viewer. It is not directly visible in FIG. 3 that the bridge (251) consists of a bent flat iron, whose corners will be pressed against the two parallel edges of the threaded cap (252) during assembly. Thereby the bridge (251) acts like an open-end wrench to the two parallel edges of the threaded cap (252) and holds it in this position when the central screw (26) is screwed into the threaded cap (252).

FIG. 4 displays a support (2) similar to the FIGS. 1b, 2a and 3, but not fully extended. As a difference to FIG. 3 the sectional plane is oriented transversely to the direction of travel. Similar to FIG. 3 is also shown in FIG. 4 the threaded spindle (6), but here without the stop at the bottom end. Therefore the threaded spindle (6) in the version according to FIG. 4 must be only that long that in the fully extended state the end of the threaded spindle (6) joins in the threaded supporting plate (61), which is connected with the support middle part (221). This embodiment eliminates the prolongation of the threaded spindle (6) for the cantilevered limit stop (62). Because the threaded spindle (6) is thereby shorter, the entire height of the support (2) is reduced, which is defined as the object of this invention.

With this embodiment a stop limit is required elsewhere. In FIG. 4 it can be seen clearly that the support middle part (221) is spaced from the outer support tube (21). This gap bypasses the two guiding sleeves (223, 224). The upper guiding sleeve (223) is fixedly connected to the support middle part (221) and slides with its outer surface in the outer support tube (21). The lower guiding sleeve (224) slides on the outer surface of the column middle part (221), the bearing stub (232) and the support base part (222) and is connected to the outer support tube (21).

In FIG. 4 it is well comprehensible that by rotating the threaded spindle (6) the threaded supporting plate (61) moves downward and lowers thereby the firmly connected support middle part (221) and the upper guiding sleeve (223), which is also firmly connected.

FIG. 4 illustrates that the downward movement of the upper guiding sleeve (223) is limited by the impacting of its front edge on the front edge of the lower guiding sleeve (224). Thus the lower guiding sleeve (224) serves as a stop for the upper guiding sleeve (223).

During the assembly of the support (2) in the first step the supporting middle part (221) must be inserted into the outer support tube (21) together with the thereon attached upper guiding sleeve (223) and the other parts of the inner support (22), which are connected to it. This is only possible if the lower guiding sleeve (224) is inserted in a second step in the outer support tube (21).

In order to serve in this location as a stop for the upper guiding sleeve (223), the lower guiding sleeve (224) must be linked in a third step to the outer support tube (21) with a solid anchor. In the embodiment according to FIG. 4 for this purpose radial bores are cut in the lower guiding sleeve (224) and in the outer support tube (21). Into each of those bores a sleeve holder (225) is inserted. Basically the invention prefers for the lower guiding sleeve (224) a detachable connection, for which other mechanical connectors, such as screws, bolts or clamps are suitable.

In FIG. 4 the pivot bearing (23) is shown in the same embodiment as in the FIG. 3. The support middle part (221) and the pivot bearing (23) and the support base part (222) have a square cross-section. Other cross-sections, which are not shown here, such as for example a rectangle, are alternatively selectable.

From the pivot bearing (23) can be seen in FIG. 4 the two holding portions (231), of which the first is inserted into the support middle part (221) and the second into the support base part (222). Onto the upper holding portion (231) is formed on at the left side the bulky bearing stub (232) and at the right side the slender hearing shell (233). Likewise are formed also onto the lower holding portion (231) a bearing stub (232) and a bearing shell (233). Both holding portions (231) are visible in FIG. 4 however in reverse order, because they are identical to each other and arranged with an offset of 180°. That the two parts of the pivot bearing (23) are identical and are mounted with an offset to each other, has the advantage of equal parts.

Overall the FIGS. 1a to 4 show that a support (2) according to the present invention (2) with the here described features minimize the overall height of the entire system and improves the disadvantages of the previously known supports like high space requirement, high material consumption and high material costs and high system weight and elaborate assembly. In addition the previous "rattling" of the unloaded support (2) while driving is eliminated.

LIST OF REFERENCE NUMERALS 1 semi-trailer
11 vehicle frame of the semi-trailer 1
111 lower flange of the vehicle frame 11
12 vehicle axis for running wheels 16 with trailing arms 17
13 parking area for semi-trailer 1
14 position offset of the semi-trailer 1
15 ground clearance of the semi-trailer 1
16 running wheels on vehicle axis 12 and trailing arms 17
17 trailing arms, connect running wheels 16 and vehicle axis 12 with vehicle frame 11
2 Support of the semi-trailer 1
21 outer support tube of the support 2
22 inner support of the support 2
221 support middle part of the inner support 22
222 support base part of the inner support 22
223 upper guiding sleeve between support middle part 221 and outer support tube 21
224 lower guiding sleeve at the inner side of the outer support tube 21
225 sleeve holder for the lower guiding sleeve 224
23 pivot bearing of the inner support 22
231 holding portion of the pivot bearing 23
232 bearing stub on holding portion 231
233 bearing shell on holding portion 231
234 retaining ring, surrounds bearing stub 232 and bearing shell 233
235 bearing surfaces between bearing stub 232, bearing shell 233 und retaining ring 234
24 rolling segment at the support base part 222
241 rolling surface at rolling segment 24
242 opening in rolling surface 241
243 hole for a cog in rolling surface 241
25 pressure spring between rolling segment 24 and threaded cap 252
251 bridge inside of support base part 222
252 threaded cap on pressure spring 25
26 pulling rod or central screw
261 ball head on pulling rod 26
27 unused reference numeral
28 rolling plate for the rolling of the rolling segment 24
281 dome-shaped bulge in rolling plate 28
282 slot in rolling plate 28
283 cog on rolling plate 28
3 lid on outer support tube 21
31 retaining clip on lid 3
4 clamping device on lid 3
5 support profile between lid 3 and outer support tube 21
6 threaded spindle, pulls the inner support 22 into the outer support tube 21
61 threaded supporting plate, inside of support middle part 221 for threaded spindle 6
62 cantilevered stop to limit the stroke

The invention claimed is:
1. A support for supporting and compensating a shift in a position of a parked semi-trailer, the support comprising:
an outer support tube and
an inner support telescopically slidably received in at least a portion of the outer support tube, the inner support comprising a support middle part and a support base part, said support middle and support base parts being hinged together by a pivot bearing a rolling segment, wherein a lower end of the support base part is rigidly connected to the rolling segment and an outer surface of the outer support tube is fully closed along a circumference edge facing the inner support that and the rolling segment has a dished shape and in a retracted state of the support the outer support tube protrudes into the rolling segment.

2. A support according to claim 1, wherein the dish shape is trough-shaped to provide a trough-shaped rolling segment and at a lowest point of a concave side of the trough-shaped rolling segment the support base part is affixed and between the support base part and side walls of the rolling segment an alley is free.

3. A support according to claim 1, wherein the pivot bearing comprises at least two hinge parts which are spaced apart from each other and a threaded spindle or another drive for moving the inner support can be guided through the gap between the two hinge parts.

4. A support according to claim 3, wherein
the threaded spindle is rotatably linked with the upper end of the outer support tube and engaged with a threaded supporting plate, which is firmly connected with the upper end of the support middle part and an upper guiding sleeve is mounted on the outside and near of the end of the support middle part and slides on the inner surface of the outer support tube and
a lower guiding sleeve is releasably attached on the inside and near the lower end of the outer support tube and slides on the outer surfaces of the support middle part and the support base part, whereby the end edges of the two guiding sleeves lie on one another, if the support middle part is extracted to a maximum.

5. A support according to claim 1 wherein the rolling segment rests via a rolling plate on a parking area and at least one pressure spring presses the unloaded rolling plate onto the rolling segment, whereby a first end of the pressure spring rests within the support base part on the inside of the rolling segment and a second end of the pressure carries a threaded cap or another pressure plate and a pulling rod is secured to said pressure plate, as e.g. said pulling rod is bolted into the threaded cap and said pulling rod extends through an opening in the roller segment and said pulling rod is hinged to the rolling plate.

6. A support according to claim 5, wherein that for connecting the pulling rod with the rolling plate into the rolling plate a dome-shaped bulge is formed, which is perforated by a slot and which extends into the opening of the rolling segment if the rolling plate is unloaded and said pulling rod extends through said slot and bears a ball head or a ball head bearing or a ball shaped washer, which is shaped complementary to the concave surface of the bulge and slides on its surface.

7. A support according to claim 5, wherein in the rolling segment at least one recess or hole for a cog is formed and in the rolling plate at least one tooth increase or cog is formed, which increase or cog projects into a respective recess or hole of the roller segment when the latter rolls on the rolling plate, wherein at least one cog may be at least in part formed as a truncated cone or a spherical segment.

8. A support according to claim 5, wherein a bridge is arranged centrally above the opening, whereby the bridge is attached in the support base part or on the inside of the rolling segment and that underside of the bridge, which is oriented towards the opening is formed complementary to the threaded cap and can be connected to it form-locking.

9. A support according to claim 1 wherein the lower flange of the vehicle frame from the semi-trailer rests directly on the upper edge of the outer support tube or on a lid on this upper edge, whereby to the outer support tube or to the lid can be integrally formed on or attached to at least one U-shaped retaining clip and/or another clamping device, which connects the support releasably to the lower flange or another part of the vehicle frame.

* * * * *